June 30, 1964  R. J. HARRIS  3,139,096
PORTABLE CAR WASH
Filed Nov. 19, 1962
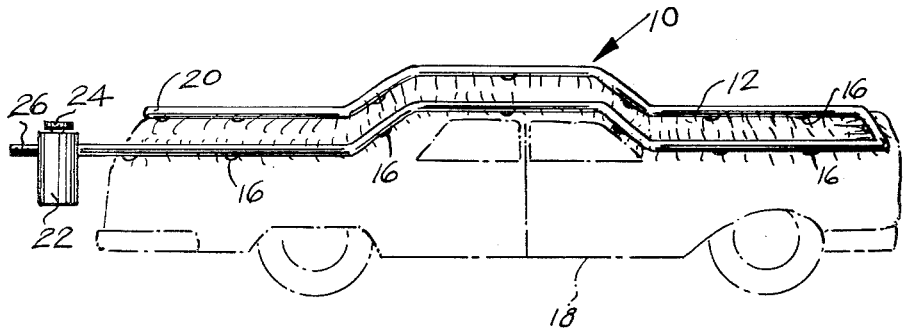
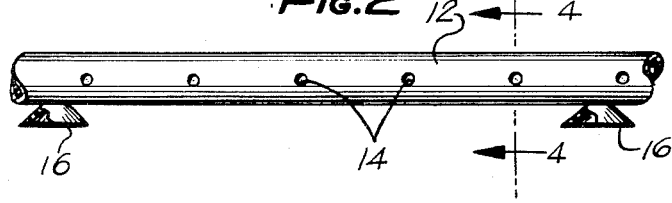
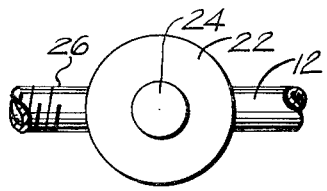
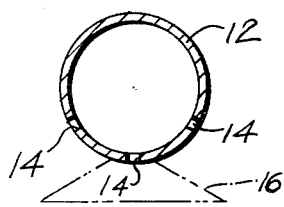
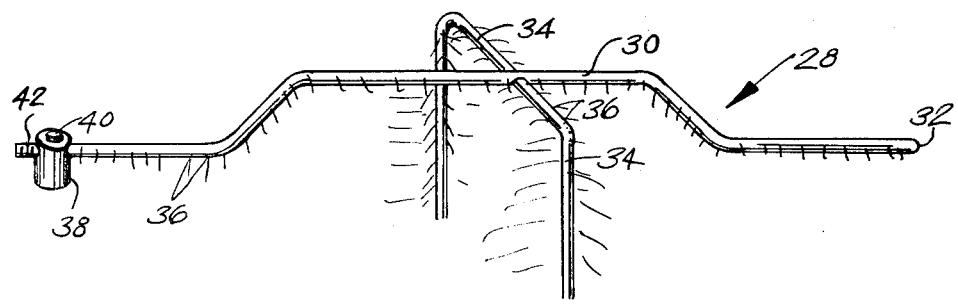
INVENTOR.
ROBERT J. HARRIS United States Patent Office 3,139,096
Patented June 30, 1964

3,139,096
PORTABLE CAR WASH
Robert J. Harris, 502 N. Rama Drive, La Puente, Calif.
Filed Nov. 19, 1962, Ser. No. 238,684
1 Claim. (Cl. 134—100)

This invention relates to car washing devices and more particularly to a portable car washing device.

It is an object of the present invention to provide a portable car wash which will be laid upon the roof of the vehicle, the rear deck, and the hood of the vehicle simultaneously.

Another object of the present invention is to provide a portable car wash which will automatically dispense soap with the water from a container secured within the device when desired.

A further object of the present invention is to provide a portable car wash which will have a connecting means for securing a garden hose to the soap container.

Other objects of the invention are to provide a portable car wash bearing the above objects in mind which is of simple construction, has a minimum number of parts, is inexpensive to manufacture and efficient in operation.

For other objects and for a better understanding of the invention reference may be had to the following detailed description taken in conjunction with the accompanying drawing, in which:

FIGURE 1 is a perspective view of a car washing device comprising the present invention;

FIGURE 2 is an enlarged fragmentary side view of the invention shown in elevation;

FIGURE 3 is a top plan view of the soap dispenser shown removed from the invention;

FIGURE 4 is a transverse view taken on the lines 4—4 of FIGURE 2; and

FIGURE 5 is a perspective view showing a modified form of the invention.

Referring now more in detail to the drawing, a portable car wash 10 made in accordance with the present invention is shown to include a flexible and U-shaped configurated hose 12 made of plastic or other suitable material having a plurality of angularly spaced apart circular openings 14 running its entire length which provide a means for water under pressure within hose 12 to spray onto an automobile. A plurality of rubber suction cups 16 are fixedly secured beneath hose 12 and thus provide a means for securing hose 12 to the top surfaces of automobile 18. Hose 12 has a closed off end 20 while the other end is fixedly secured to a container 22 of cylindrical configuration which may contain a detergent or soap for washing the automobile 18. Container 22 is provided with a threaded cap 24 at its upper end and a hollow coupling 26 is fixedly secured at the top of container 22 and provides a means for threadingly receiving a garden hose which supplies the water under pressure to portable car wash 10.

In operation, the operator connects the garden hose to the coupling 26 of container 22 after he places the hose 12 into position on the top surfaces of automobile 18. The operator then adds soap, if wanted, into the container 22 and screws the cap 24 back into position and then turns the water on at its source. The water then thus mixes with the soap in container 22 and travels through the flexible hose 12 and sprays out of the openings 14 whereupon the operator can wash the automobile 18.

It shall thus be recognized that the openings within hose 12 are angularly spaced apart thus allowing the spray of water to cover a large area.

It shall be noted that before turning on the water pressure from garden hose the operator urges downward upon the hose 12 at the points where the suction cups 16 are located and thus secures hose 12 to the top surfaces of the automobile 18 which will prevent hose 12 from slipping off of automobile 18 or snaking from the jet action of the water under pressure which might occur.

In (FIGURE 5) a modified form of car wash 28 is shown to include a flexible hose 30 of plastic or other suitable material having a closed end 32 at one end. A pair of hoses 34 intersect hose 30 near the center of the roof of the vehicle for distributing water. The center hose 30 and the hoses 34 are provided with angularly spaced apart openings 36 along their entire lengths thus providing a means for water under pressure to spray on the vehicle. The end after the closed end 32 is provided with a cylindrical hollow container 38 which will receive a detergent or soap for mixing with the water and container 38 is provided with a screw top 40 at its upper end and a coupling 42 which will threadingly receive a garden hose.

In operation, the operator secures portable car wash 28 to a garden hose by threading coupling 42 into the end of the garden hose and thus the spraying action is similar to the afore-mentioned embodiment.

While various changes may be made in the detail construction it shall be understood that such changes shall be within the spirit and scope of the present invention as defined by the appended claim.

What I claim as new and desire to protect by Letters Patent of the United States is:

A portable car wash of the class described, comprising, in combination, a substantially flexible hose, a substantially cylindrical detergent container carried by said hose providing a means for mixing water and detergent for spraying and cleaning an automobile, an externally threaded coupling carried by said hose providing a means for receiving a garden hose, a plurality of suction cups carried by said hose providing a means for temporarily securing said hose to the top surface of said automobile, one end of said hose being closed off and the other end of said hose being secured to one side of said container and said hose being provided with a plurality of equally spaced apart and angularly downwardly positioned openings which provide an exit for water under pressure received within said hose and said water sprays out in a fan like spread thus washing said automobile, said suction cups being an integral part of said flexible hose.

References Cited in the file of this patent
UNITED STATES PATENTS

| 2,689,577 | Dunn | Sept. 21, 1954 |
| 2,785,010 | Nelson | Mar. 12, 1957 |

FOREIGN PATENTS

| 249,642 | Great Britain | Apr. 1, 1926 |